United States Patent
Tanaka et al.

[11] Patent Number: 6,160,816
[45] Date of Patent: Dec. 12, 2000

[54] SUBSCRIBER-LINE TRANSMISSION APPARATUS

[75] Inventors: Kazuo Tanaka; Eiji Shimose, both of Kawasaki, Japan

[73] Assignee: Fujitsu Limited, Kawasaki, Japan

[21] Appl. No.: 08/902,277

[22] Filed: Jul. 29, 1997

[30] Foreign Application Priority Data

Dec. 24, 1996 [JP] Japan .................................. 8-342862

[51] Int. Cl.⁷ .................................................. H04J 3/06
[52] U.S. Cl. .......................................... 370/467; 370/503
[58] Field of Search .................................. 370/465, 466, 370/249, 463, 503, 507, 506, 505, 535, 518, 470, 520, 324, 350, 467, 537, 543, 545, 474

[56] References Cited

U.S. PATENT DOCUMENTS

| | | | |
|---|---|---|---|
| 5,144,620 | 9/1992 | Ishizaki et al. | 370/535 |
| 5,335,223 | 8/1994 | Iino | 370/503 |
| 5,412,655 | 5/1995 | Yamada et al. | 370/60.1 |
| 5,481,547 | 1/1996 | Sasaki et al. | 370/505 |
| 5,541,926 | 7/1996 | Saito et al. | 370/543 |
| 5,654,815 | 8/1997 | Bunse | 359/158 |
| 5,715,252 | 2/1998 | Sato | 370/543 |
| 5,903,569 | 5/1999 | Fujisaki | 370/472 |
| 5,926,480 | 7/1999 | Deschaine et al. | 370/401 |

FOREIGN PATENT DOCUMENTS

| | | |
|---|---|---|
| 56-30347 | 3/1981 | Japan . |
| 7-255072 | 10/1995 | Japan . |
| 8-84388 | 3/1996 | Japan . |

*Primary Examiner*—Douglas W. Olms
*Assistant Examiner*—Ken Vanderpuye
*Attorney, Agent, or Firm*—Staas & Halsey LLP

[57] ABSTRACT

A first group of asynchronous clock converters effect the conversion between a DNE clock and an RDT clock to which DS-0 data and signalling data are synchronized, for the data items which are transferred between a cross-connector and a DNE. A second group of asynchronous clock converters effect the conversion between a CPE clock and the RDT clock to which DS-0 data and signalling data are synchronized, for the data items which are transferred between the cross-connector and a CPE. As a result, cross-connect processes based on the single RDT clock are realized, and loop timings are guaranteed for the DNE and the CPE.

13 Claims, 12 Drawing Sheets

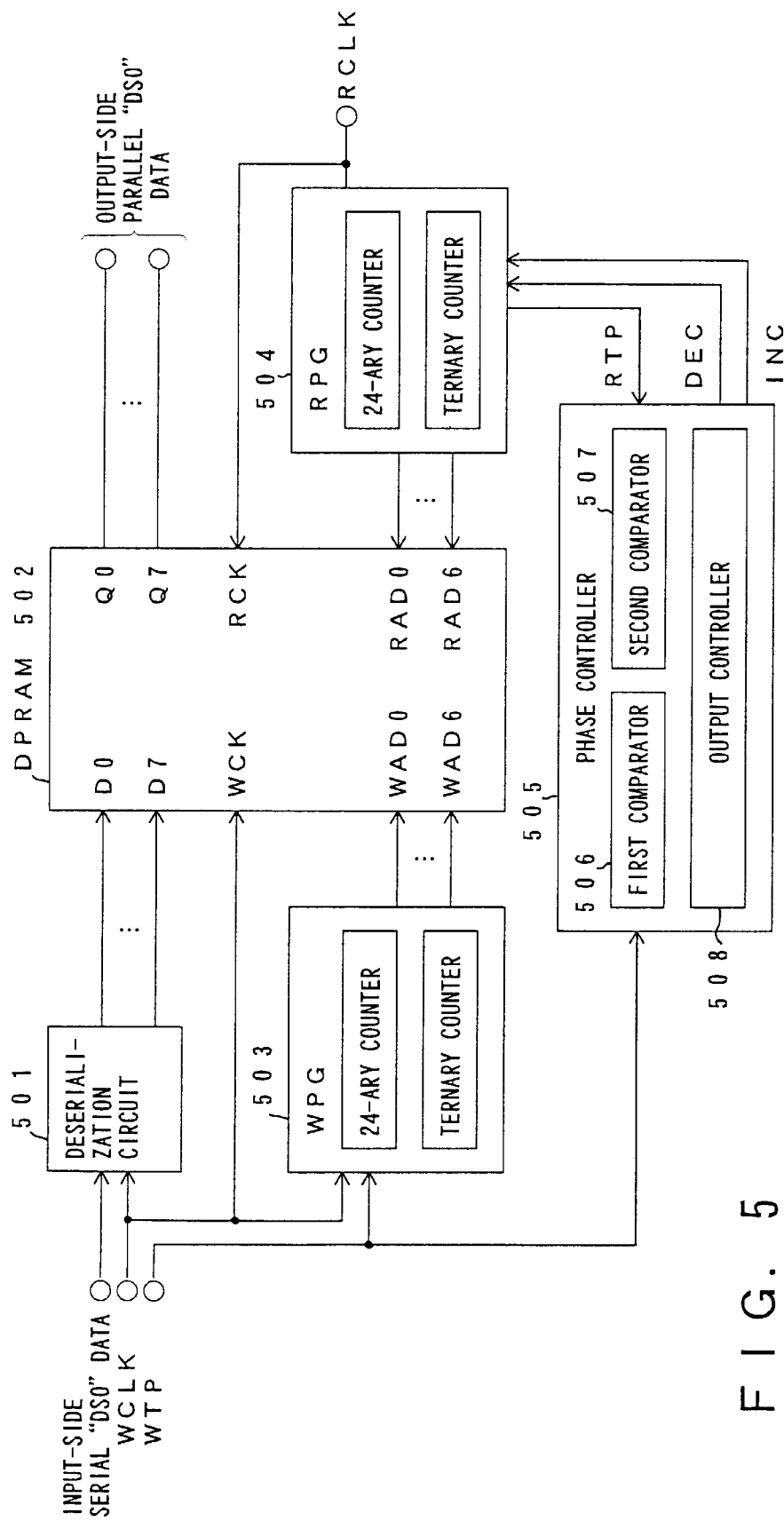
F I G. 5

| ADDRESS | OUTPUT "DS 0" DATA |
|---|---|
| 0 | #1-1 |
| 1 | #2-1 |
| 2 | #3-1 |
| ⋮ | |
| n-1 | #n-1 |
| n | #1-2 |
| n+1 | #2-2 |
| ⋮ | |
| 2n-1 | #n-2 |
| ⋮ | |
| 23n | #1-24 |
| 23n+1 | #2-24 |
| ⋮ | |
| 24n-1 | #n-24 |

FIG. 10

| INPUT ADDRESS (INPUT "DS 0" DATA) | WRITE ADDRESS (OUTPUT "DS 0" DATA) |
|---|---|
| 0 (#1-1) | 2 (#3-1) |
| 1 (#2-1) | 0 (#1-1) |
| 2 (#3-1) | 1 (#2-1) |
| ⋮ | |
| n-1 (#n-1) | n-1 (#n-1) |
| n (#1-2) | n (#1-2) |
| ⋮ | |
| 24n-1 (#n-24) | 24n-1 (#n-24) |

FIG. 11

SUBSCRIBER-LINE TRANSMISSION APPARATUS

BACKGROUND OF THE INVENTION

1. Field of the Invention

The present invention relates to a subscriber-line transmission apparatus which is installed between a network-side apparatus and a subscriber-side apparatus.

2. Description of the Related Art

A subscriber-line transmission apparatus is installed between a network-side apparatus, such as an exchange or switch, and a subscriber-side apparatus for the purposes of the prolongation of a communication distance, etc.

In recent years, the exchange has come to include an integrated digital terminal (IDT), and the IDT and a remote digital terminal (RDT) being a subscriber-line transmission apparatus have come to be directly connected by digital circuits or lines such as "DS 1" (digital signal level-1, which shall also be expressed as DS-1 below) circuits.

Heretofore, as illustrated in FIG. 1, the RDT which is connected through the DS-1 circuits with the IDT disposed in the exchange has accommodated subscriber telephones through analog metallic lines. In such a subscriber-line transmission system, as seen from FIG. 1, the RDT is supplied with a master clock through the DS-1 circuits as well as the IDT disposed in the exchange, from a timing source disposed in the exchange, and it is operated in synchronism with the master clock.

Further, the inventors have developed a subscriber-line transmission system called "DS-1 extension system" for the purposes of enhancement in the function of the subscriber-line transmission apparatus, etc.

In the DS-1 extension system, as illustrated in FIG. 2, an RDT is connected through DS-1 circuits, not only with an IDT disposed in an exchange, but also with apparatus called "digital network elements (DNE)" which are network-side apparatus other than the exchange. The RDT is also connected through DS-1 circuits with subscriber-side apparatus (such as customer premises equipment abbreviated to "CPE") other than subscriber telephones, besides accommodating the subscriber telephones through analog metallic lines. The DNE include, for example, a digital cross-connect system (DCS) or a D-4 recommendation channel bank (D4 CHBK) as shown in FIG. 2, or a toll switch not especially shown. On the other hand, the CPE have functions equivalent to those of a switching center of small scale.

In the DS-1 extension system as depicted in FIG. 2, it is required to incorporate the function of transparently connecting the DS-1 circuits associated with the IDT and the DS-1 circuits associated with the CPE, or the DS-1 circuits associated with the DNE and the DS-1 circuits associated with the CPE, respectively. Such a function is called the "un-channelized DS-1 function".

Besides, in the DS-1 extension system as depicted in FIG. 2, it is required to incorporate the function (cross-connect function) of fixedly exchanging channels (time slots) between respective DS-0 (digital signal level-0) connections accommodated in the DS-1 circuits connected to the IDT and correspondent DS-0 connections accommodated in the DS-1 circuits connected to the CPE, or between respective DS-0 connections accommodated in the DS-1 circuits connected to the DNE and correspondent DS-0 connections accommodated in the DS-1 circuits connected to the CPE. Such a function is called the "channelized DS-1 function".

Here in the DS-1 extension system as depicted in FIG. 2, the exchange accommodating the IDT, and the DNE are respectively operated in synchronism with timing sources A and B which are independent of each other. Accordingly, a technique for establishing the synchronization of the operation timings of the exchange accommodating the IDT, the DNE and the CPE becomes very important in the RDT which constitutes the DS-1 extension system.

The RDT constituting the DS-1 extension system needs to execute cross-connect processes for the plurality of DS-0 connections accommodated in the plurality of DS-1 circuits to which the various devices as shown in FIG. 2 are connected. For this purpose, the RDT needs to operate in synchronism with common timings, especially with the operation timing of the exchange accommodating the IDT to which it is connected. In general, accordingly, the RDT executes the cross-connect processes, etc. with a clock (RDT clock #1 shown in FIG. 3) which is extracted from the DS-1 circuit connected to the IDT within the exchange, which is synchronized to the timing source A within the exchange, and which is used as a master clock.

Further, the RDT delivers cross-connected communication data to the DS-1 circuit laid toward CPE, in synchronism with the RDT clock #1. Here, synchronization to an identical clock is required of the communication data on the up DS-1 circuit and communication data on the down DS-1 circuit, the up and down DS-1 circuits being terminated by one device. When such a condition is fulfilled, it is usually said that a loop timing is guaranteed. Accordingly, the CPE connected to the RDT delivers the communication data to the DS-1 circuit laid toward the RDT, in synchronism with a clock extracted from the DS-1 circuit laid from the RDT, in order to guarantee the loop timing for the up and down DS-1 circuits at which this CPE terminates. If the loop timing is perfectly guaranteed in the CPE, the RDT can operate in synchronism with the RDT clock #1 to receive the communication data transferred thereto on the DS-1 circuit laid from the CPE and to execute the cross-connect process for the received data. In fact, however, the loop timing is not always perfectly guaranteed in the CPE, and the RDT clock #1 and a clock on the DS-1 circuit laid from the CPE (a clock #3 from the CPE as shown in FIG. 3) are not always in synchronism with each other. Posed as a problem in such a case is how the RDT establishes the synchronization in order to execute the reception process and the cross-connect process for the communication data transferred thereto on the DS-1 circuit laid from the CPE.

Nevertheless, a technique for such synchronization establishment has not hitherto been known.

Meanwhile, the DNE connected to the RDT delivers communication data to the DS-1 circuit laid toward the RDT in synchronism with a clock (clock #2 from the DNE as shown in FIG. 3) which is generated by the timing source B built in this DNE. On the other hand, the RDT must deliver communication data to the DS-1 circuit laid toward the DNE, in synchronism with a clock extracted from the DS-1 circuit laid from the DNE, in order to guarantee a loop timing for the up and down DS-1 circuits which correspond to the DNE. As stated before, however, the RDT operates in synchronism with the RDT clock #1. It is therefore posed as problem how the RDT establishes the synchronization in order to execute the cross-connect process and the transmission process with the loop timing guaranteed, for the communication data transferred thereto on the DS-1 circuit laid toward the DNE.

Nevertheless, a technique for such synchronization establishment has not hitherto been known, either.

The problems mentioned above are not involved only in the DS-1 extension system, but they are generally existent in relation to a subscriber-line transmission apparatus which terminates a plurality of circuits synchronized with a plurality of timing sources and which executes cross-connect processes among the circuits.

SUMMARY OF THE INVENTION

The present invention has been made with the background explained above, and it has for its object to guarantee a loop timing for each of a plurality of circuits synchronized with a plurality of timing sources and to realize cross-connect processes among the circuits.

The present invention is premised on a subscriber-line transmission apparatus (RDT 401 in FIG. 4) which is installed between a network-side apparatus, such as exchange or switch, and a subscriber-side apparatus.

First, a circuit terminating set (clock regenerators 409, 417; frame synchronizers/signalling extractors 410, 418; and frame generators/signalling inserters 413, and 416) terminates a plurality of circuits synchronized with a plurality of timing sources. The circuit terminating set includes, for example, a circuit terminator serving to terminate circuits (DS-1 circuits) to which a network-side apparatus (DNE 403) operating in synchronism with an independent timing source is connected, and a circuit terminator serving to terminate circuits (DS-1 circuits) to which a subscriber-side apparatus (CPE 404) operating at a timing dependent upon the subscriber-line transmission apparatus (RDT 401) is connected.

A cross-connecting set (a cross-connector 407) executes cross-connect processes between the plurality of circuits which are terminated by the circuit terminating set.

An asynchronous-clock converting set (asynchronous clock converters 411d, 411s, 412d, 412s, 419d, 419s) converts clocks with which communication data are synchronized, regarding the communication data to be transferred between the circuit terminating set and the cross-connecting set which operate on the basis of the clocks asynchronous to each other. The asynchronous-clock converting set includes, for example, converters (asynchronous clock converters 411d, 411s, 412d, 412s) serving to convert clocks with which communication data are synchronized, regarding the respective communication data to be bidirectionally transferred between the cross-connecting set and the circuit terminator for terminating the circuits to which the network-side apparatus (DNE 403) is connected, and converters (asynchronous clock converters 419d, 419s) serving to convert clocks with which communication data are synchronized, regarding the communication data to be transferred toward the cross-connecting set from the circuit terminator for terminating the circuits to which the subscriber-side apparatus (CPE 404) is connected. In a practicable construction, the asynchronous clock converter includes a memory (DPRAM 502 in FIG. 5) in which communication data for a plurality of frames are stored, each frame being a group of data that consists of a plurality of channel data as predetermined, a write controller (WPG 503) by which the communication data are successively written into the memory in frame units in synchronism with a clock (WCLK) on an input side, a readout controller (RPG 504) by which the communication data are successively read out of the memory in frame units in synchronism with a clock (RCLK) on an output side, and a phase controller (phase controller 505) which executes a stuff control that compares the phasic relations of the clock of the input side and that of the output side, thereby instructing the write controller or the readout controller to discard or repeatedly deliver the communication data in frame units.

Owing to the above construction of the present invention, the cross-connecting set can realize the cross-connect processes among the plurality of circuits in synchronism with the single unified master clock, and it can simultaneously guarantee the loop timings for the respective pairs of the plurality of circuits synchronized with the plurality of timing sources.

In the foregoing construction of the present invention, the communication data (DS-1 signal) contains user data (DS-0 data) and control data (signalling data). In that case, the asynchronous clock converters can be contrived so as to convert the clocks with which the user data and the control data are respectively synchronized, for these data items independently of each other (the relations between the asynchronous clock converters 411d and 411s, between the converters 412d and 412s, and between the converters 419d and 419s).

When the asynchronous-clock conversion processes are executed independently for the user data and the control data in this manner, the difference between the transmission rates of the user data and the control data can be absorbed.

Besides, the foregoing construction of the present invention can be contrived so as to further comprise a selecting set (selectors 414, 415, 420, 421 in FIG. 4) by which communication data are transferred among the plurality of circuit terminators transparently without executing any of the cross-connect processes and the asynchronous-clock conversion processes.

In this way, the communication data can be selectively transferred transparently, whereby the function of the subscriber-line transmission apparatus can be enhanced.

BRIEF DESCRIPTION OF THE DRAWINGS

Other objects and features of the present invention will be readily understood by one skilled in the art from the description of the preferred embodiments of the invention taken in conjunction with the accompanying drawings, wherein:

FIG. 5 is a block diagram showing an asynchronous clock converter;

FIG. 10 is a diagram showing the data organization of a DPRAM (dual-port random access memory) which is included in the cross-connect portion;

FIG. 11 is a diagram showing the data organization of an ACM (access control memory)

DESCRIPTION OF THE PREFERRED EMBODIMENTS

Now, the preferred embodiments of the present invention will be described in detail with reference to the drawings.

Description of the Whole Construction of These Preferred Embodiments

Figure 1:
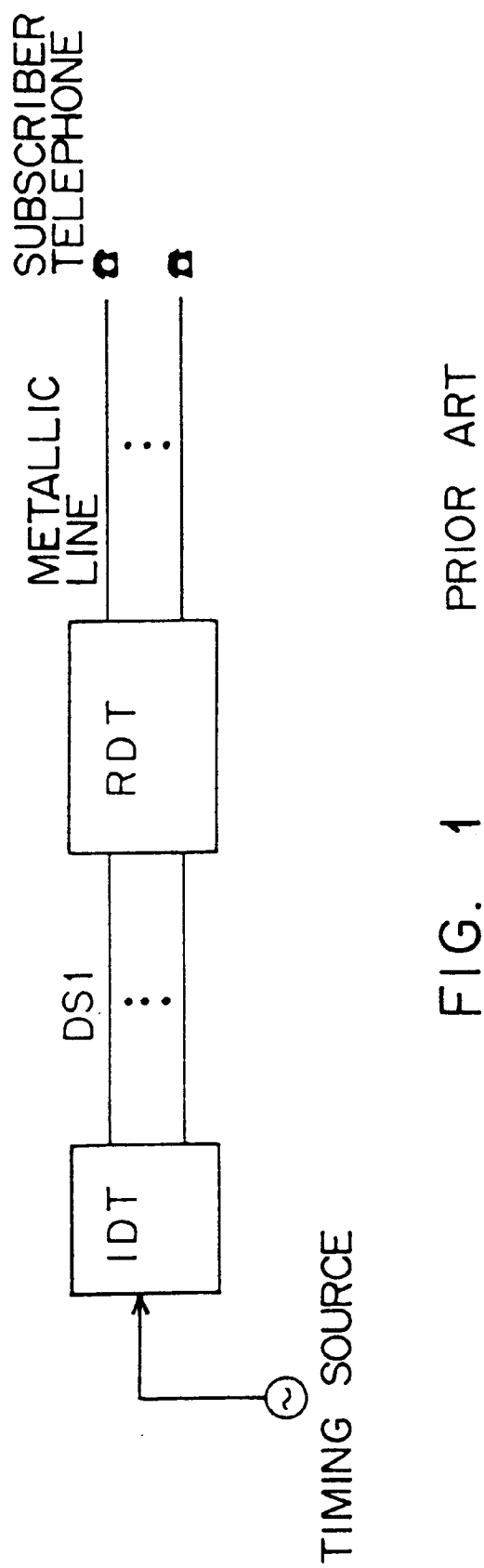
FIG. 1 is a block diagram showing a subscriber-line transmission system in the prior art.
Figure 2:
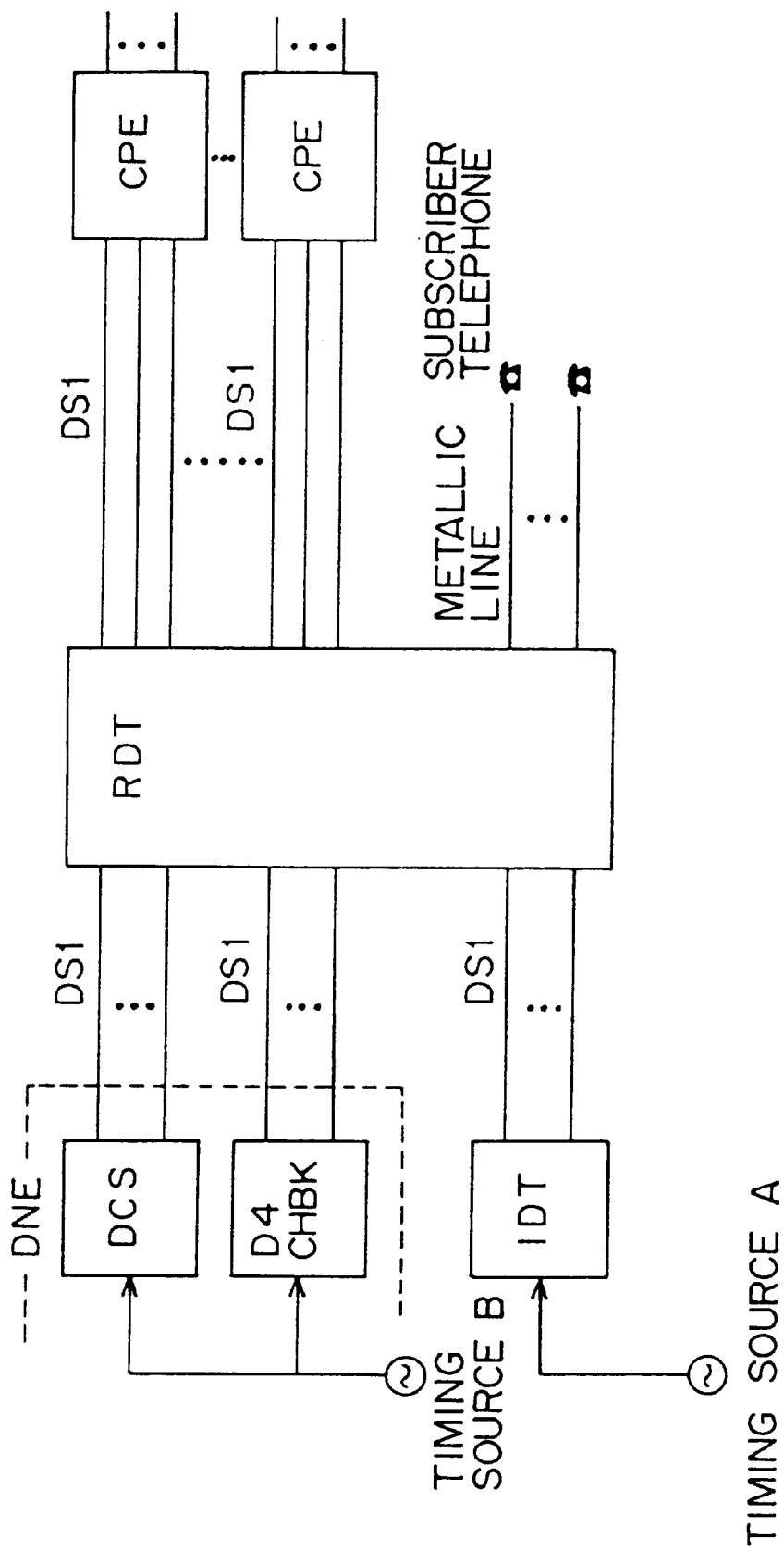
FIG. 2 is a block diagram showing a DS-1 extension system.
Figure 3:
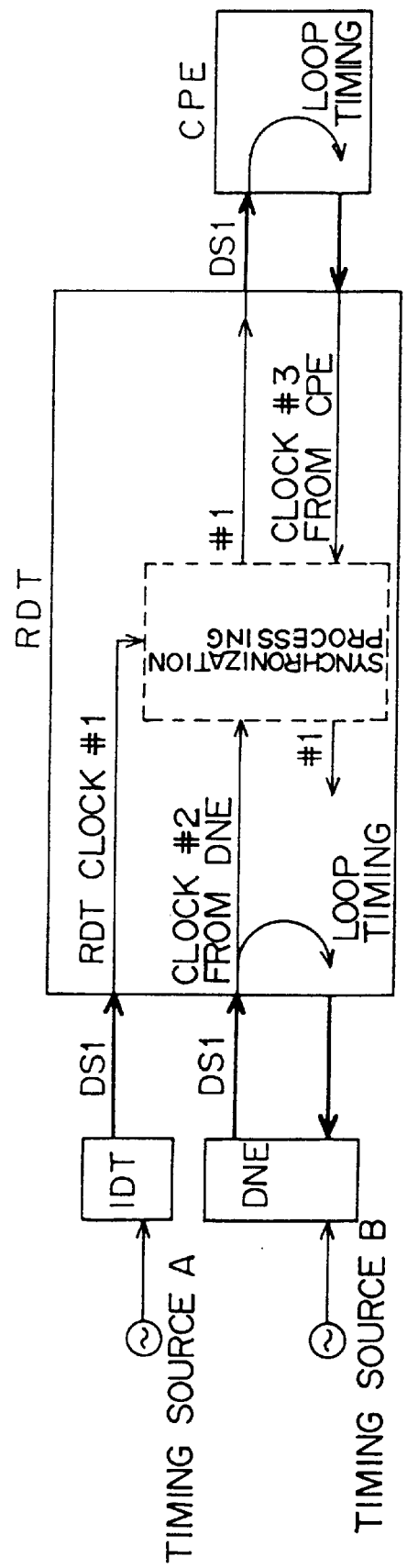
FIG. 3 is a diagram for explaining a clock synchronization mechanism which is required of the DS-1 extension system.
Figure 4:
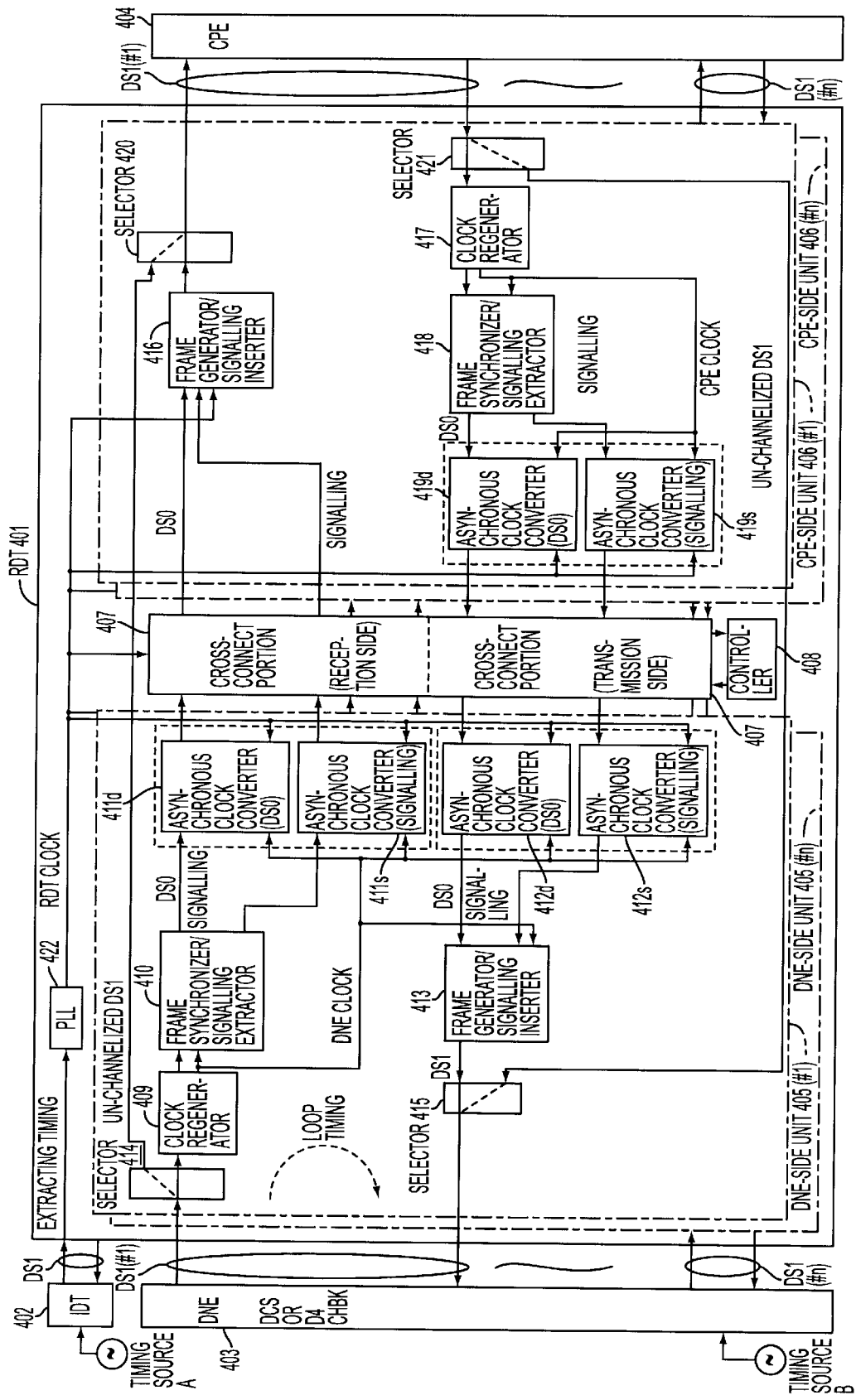
FIG. 4 is a block diagram showing the first preferred embodiment of the present invention.

FIG. 4 is a block diagram showing the preferred embodiment of an RDT 401 according to the present invention. The RDT 401 incarnates a DS-1 extension system.

First, in the RDT 401, an extraction timing clock is derived from a DS-1 circuit which is connected to an IDT 402 included in an exchange or switch. Upon receiving the derived clock, a PLL (phase-locked loop) circuit 422 extracts an RDT clock being the master clock of the RDT 401.

On the other hand, pairs #1-#n of DS-1 circuits for connecting the RDT 401 with at least one DNE 403 are terminated by DNE-side units 405 (#1-#n) included in the RDT 401.

Further, pairs #1-#n of DS-1 circuits for connecting the RDT 401 with at least one CPE 404 are terminated by CPE-side units 406 (#1-#n) included in the RDT 401. Incidentally, the number n of the DS1 circuit pairs on the side of the DNE 403 need not be the same as that of the DS-1 circuit pairs on the side of the CPE 404.

A DNE-side reception DS-1 signal transferred from the DNE 403 to the RDT 401 on one of the DS-1 circuits laid toward the RDT 401 is input to the DNE-side unit 405 terminating the particular DS-1 circuit.

In the DNE-side unit 405, the DNE-side reception DS-1 signal is first input to a clock regenerator 409 through a selector 414 (to be explained later).

The clock regenerator 409 regenerates a clock (DNE clock: corresponding to the clock #2 from the DNE as shown in FIG. 4) from the DNE-side reception DS-1 signal.

Subsequently, a frame synchronizer/signalling extractor 410 establishes frame synchronization for the DNE-side reception DS-1 signal on the basis of the regenerated DNE clock delivered from the clock regenerator 409. Thus, a DS-0 data group of 24 channels constituting each frame (=125 [μsec]) of the DNE-side reception DS-1 signal is separated from signalling data.

Next, an asynchronous clock converter (DS-0) 411d and an asynchronous clock converter (signalling) 411s subject the DS-0 data group and the signalling data separated from each other as stated above, to clock changeover processes wherein the DNE clock extracted from the DS-1 circuit at which the current DNE-side unit 405 terminates is changed to the RDT clock, respectively. As a result, the DS-0 data group and the signalling data having been synchronized to the DNE clock extracted from the DS-1 circuit at which the current DNE-side unit 405 terminates, come to be synchronized with the RDT clock which is the master clock of the RDT 401.

The DS-0 data group output from the asynchronous clock converter (DS-0) 411d, and the signalling data output from the asynchronous clock converter (signalling) 411s are input to a cross-connect portion 407 (reception side). The cross-connect portion 407 (reception side) is supplied with sets or pairs each consisting of a DS-0 data group and signalling data, from the individual DNE-side units 405 (#1-#n).

In this way, the cross-connect portion 407 (reception side) is permitted to execute cross-connect processes on the basis of the common RDT clock, for the DS-0 data groups and the signalling data items on the DS-1 circuits at which the respective DNE-side units 405 terminate.

On the other hand, a DS-0 data group and signalling data in one set which are output from a cross-connect portion 407 (transmission side) are input to the DNE-side unit 405 corresponding to the set.

In the particular DNE-side unit 405, the DS-0 data group and the signalling data in the set are respectively input to an asynchronous clock converter (DS-0) 412d and an asynchronous clock converter (signalling) 412s.

The asynchronous clock converter (DS-0) 412d and the asynchronous clock converter (signalling) 412s subject the DS-0 data group and the signalling data delivered from the cross-connect portion 407 (transmission side), to clock changeover processes wherein the RDT clock is changed to the DNE clock extracted from the DS-1 circuit at which the current DNE-side unit 405 terminates, respectively. As a result, the DS-0 data group and the signalling data having been synchronized with the RDT clock come to be synchronized with the DNE clock extracted from the DS-1 circuit at which the current DNE-side unit 405 terminates. In this way, a loop timing is guaranteed for the DS-1 circuit at which each DNE-side unit 405 terminates.

Subsequently, a frame generator/signalling inserter 413 generates each frame constituting a DNE-side transmission DS-1 signal, from a DS-0 data group of 24 channels delivered from the asynchronous clock converter (DS-0) 412d and signalling data delivered from the asynchronous clock converter (signalling) 412s.

The DNE-side transmission DS-1 signal delivered from the frame generator/signalling inserter 413 is output through a selector 415 (to be explained later) to the DS-1 circuit which corresponds to the current DNE-side unit 405.

Next, the CPE-side units 406 will be explained.

As stated before, the CPE-side units 406 exist in the number n (as #1-#n) in correspondence with the DS-1 circuit pairs #1-#n which connect the RDT 401 to at least one CPE 404. Herein, a DS-0 data group and signalling data in one set which are output from the cross-connect portion 407 (reception side) are input to the CPE-side unit 406 which corresponds to the particular set.

In this CPE-side unit 406, a frame generator/signalling inserter 416 generates each frame constituting a CPE-side transmission DS-1 signal, from the DS-0 data group of 24 channels and the signalling data delivered from the cross-connect portion 407 (reception side).

The CPE-side transmission DS-1 signal delivered from the frame generator/signalling inserter 416 is output through a selector 420 (to be explained later) to the DS-1 circuit which corresponds to the current CPE-side unit 406.

In this way, the CPE-side transmission DS-1 signal to be output to the DS-1 circuit laid toward the CPE 404 is synchronized with the RDT clock which is the master clock of the RDT 401.

On the other hand, a CPE-side reception DS-1 signal transferred from the CPE 404 to the RDT 401 on one of the DS-1 circuits laid toward the RDT 401 is input to the CPE-side unit 406 terminating the particular DS-1 circuit.

In this CPE-side unit 406, the CPE-side reception DS-1 signal is first input to a clock regenerator 417 through a selector 421 (to be explained later).

The clock regenerator 417 regenerates a clock (CPE clock: corresponding to the clock #3 from the CPE as shown in FIG. 4) from the CPE-side reception DS-1 signal.

Subsequently, a frame synchronizer/signalling extractor 418 establishes frame synchronization for the CPE-side reception DS-1 signal on the basis of the regenerated CPE clock delivered from the clock regenerator 417. Thus, a DS-0 data group of 24 channels constituting each frame (=125 [μsec]) of the CPE-side reception DS-1 signal is separated from signalling data.

Next, an asynchronous clock converter (DS-0) 419d and an asynchronous clock converter (signalling) 419s subject the DS-0 data group and the signalling data separated from each other as stated above, to clock changeover processes wherein the CPE clock extracted from the DS-1 circuit at which the current CPE-side unit 406 terminates is changed to the RDT clock, respectively. As a result, the DS-0 data group and the signalling data having been synchronized with the CPE clock extracted from the DS-1 circuit at which the current CPE-side unit 406 terminates, come to be synchronized with the RDT clock which is the master clock of the RDT 401.

The DS-0 data group output from the asynchronous clock converter (DS-0) 419d, and the signalling data output from the asynchronous clock converter (signalling) 419s are input to the cross-connect portion 407 (transmission side). The cross-connect portion 407 (transmission side) is supplied with sets or pairs each consisting of a DS-0 data group and signalling data, from the individual CPE-side units 406 (#1-#n).

In this way, the cross-connect portion 407 (transmission side) is permitted to execute cross-connect processes on the basis of the common RDT clock, for the DS-0 data groups and the signalling data items on the DS-1 circuits at which the respective CPE-side units 406 terminate.

At the next stage, the cross-connect portion 407 (reception side) allocates the respective DS-0 data items of the 24 channels which constitute each of the DS-0 data groups in the n sets delivered from the DNE-side units 405 (#1-#n), to any channels of the 24 ones on each of n links which are connected to the CPE-side units 406 (#1-#n).

In addition, the cross-connect portion 407 (reception side) executes predetermined conversion processes for the respective signalling data in the n sets delivered from the DNE-side units 405 (#1-#n). Thereafter, it transfers the resultant new signalling data in n sets, to the CPE-side units 406 (#1-#n).

On the other hand, the cross-connect portion 407 (transmission side) allocates the respective DS-0 data items of the 24 channels which constitute each of the DS-0 data groups in the n sets delivered from the CPE-side units 406 (#1-#n), to any channels of the 24 ones on each of n links which are connected to the DNE-side units 405 (#1-#n).

In addition, the cross-connect portion 407 (transmission side) executes predetermined conversion processes for the respective signalling data in the n sets delivered from the CPE-side units 406 (#1-#n). Thereafter, it transfers the resultant new signalling data in n sets, to the DNE-side units 405 (#1-#n).

Various setting operations for the cross-connect portion 407 (reception side) and the cross-connect portion 407 (transmission side) are carried out by a controller 408.

Meanwhile, an un-channelized DS-1 signal transferred from the DNE 403 to the RDT 401 on one of the DS-1 circuits laid toward the RDT 401 is input to the DNE-side unit 405 terminating the particular DS-1 circuit. Thereafter, the un-channelized DS-1 signal is switched by the selector 414 included in the particular unit 405 and is directly sent to the CPE-side unit 406 which terminates a predetermined one of the DS-1 circuits laid from the RDT 401 toward the CPE 404. Subsequently, it is delivered from the selector 420 included in the particular unit 406, to the DS-1 circuit at which this unit 406 terminates.

To the contrary, an un-channelized DS-1 signal transferred from the CPE 404 to the RDT 401 on one of the DS-1 circuits laid toward the RDT 401 is input to the CPE-side unit 406 terminating the particular DS-1 circuit. Thereafter, the un-channelized DS-1 signal is switched by the selector 421 included in the particular unit 406 and is directly sent to the DNE-side unit 405 which terminates a predetermined one of the DS-1 circuits laid from the RDT 401 toward the DNE 403. Subsequently, it is delivered from the selector 415 included in the particular unit 405, to the DS-1 circuit at which this unit 405 terminates.

Description of the Asynchronous Clock Converters

Next, FIG. 5 is a block diagram showing the asynchronous clock converter (DS-0) 411d, 412d or 419d depicted in FIG. 4.

In a case where a block arrangement in FIG. 5 is of the asynchronous clock converter (DS-0) 411d in FIG. 4, input-side serial DS-0 data corresponds to the DS-0 data group delivered from the frame synchronizer/signalling extractor 410, output-side parallel DS-0 data items are output to the cross-connect portion 407 (reception side), a write clock WCLK corresponds to the DNE clock, and a readout clock RCLK corresponds to the RDT clock.

Besides, in a case where the block arrangement in FIG. 5 is of the asynchronous clock converter (DS-0) 419d in FIG. 4, the input-side serial DS-0 data corresponds to the DS-0 data group delivered from the frame synchronizer/signalling extractor 418, the output-side parallel DS-0 data items are output to the cross-connect portion 407 (transmission side), the write clock WCLK corresponds to the CPE clock, and the readout clock RCLK corresponds to the RDT clock.

Further, in a case where the block arrangement in FIG. 5 is of the asynchronous clock converter (DS-0) 412d in FIG. 4, a serial/parallel converting circuit 501 shown in FIG. 5 is not mounted, and the parallel DS-0 data items of the cross-connect portion 407 (transmission side) are directly input to a DPRAM (dual-port random access memory) 502. In this case, the output-side parallel DS-0 data items are output to the frame generator/signalling inserter 413, the write clock WCLK corresponds to the RDT clock, and the readout clock RCLK corresponds to the DNE clock.

Incidentally, the ensuing description shall imply the changes to read concerning the presence or absence of the deserialization circuit 501 and the contents of the input-side serial DS-0 data.

In the block arrangement shown in FIG. 5, the input-side serial DS-0 data is converted by the deserialization circuit 501 into parallel DS-0 data items of 8 bits (hereinbelow, termed "write data"), which are input to the input terminals D0–D7 of the dual-port RAM (DPRAM) 502.

The DPRAM 502 can store therein DS-0 data groups corresponding to 24 channels×3 frames.

The write data for the DPRAM 502 is written into a write address in synchronism with the write clock WCLK entering a clock terminal WCK and with the write address being input from a write pulse generator circuit (WPG) 503 to write address terminals WAD0–WAD6 in synchronism with the write clock WCLK.

In this case, the WPG 503 includes a ternary counter which determines high-order address blocks corresponding respectively to the 3 frames, and a 24-ary counter which determines lower-order addresses for the 24 channels within each address block. The ternary counter in the WPG 503 is caused to count up by a carry signal which is output each time the 24-ary counter in the WPG 503 ends count operations for 1 frame=24 channels, and it is reset by a write timing pulse WTP. The write timing pulse WTP is a pulse which has a period being 3 times longer than the period of a frame clock synchronized with the write clock WCLK, and which is generated in, for example, the frame synchronizer/signalling extractor 410 or 418, etc., in FIG. 4 (refer to (a) in FIG. 6).

The DS-0 data from the DPRAM 502 (hereinbelow, termed "readout data") is read out of a readout address in synchronism with the readout clock RCLK entering a clock terminal RCK, the readout address being input from a readout pulse generator circuit (RPG) 504 to readout address terminals RAD0–RAD6 in synchronism with the readout clock RCLK.

In this case, likewise to the WPG 503, the RPG 504 includes a ternary counter which determines high-order address blocks corresponding respectively to the 3 frames, and a 24-ary counter which determines lower-order addresses for the 24 channels within each address block. The ternary counter in the RPG 504 is caused to count up cyclically for count values of 0 to 2 by a carry signal which is output each time the 24-ary counter in the RPG 504 ends count operations for 1 frame=24 channels. When the carry signal is input under the condition of the count value 2, the count value returns to 0. Besides, at the timing at which the count value returns to 0, the RPG 504 delivers a readout timing pulse RTP to a phase controller 505 to be explained later (refer to (e) in FIG. 6).

Figure 6:
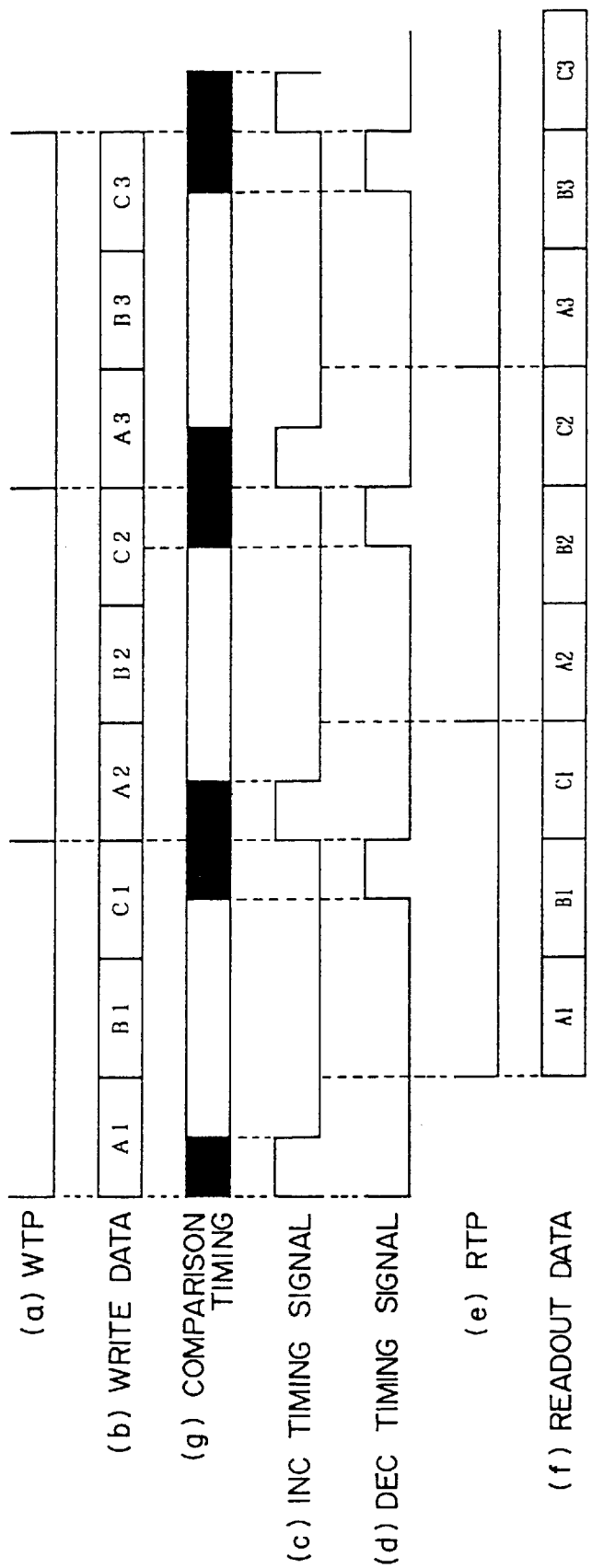
FIG. 6 is an operational timing chart (the first chart) of the asynchronous clock converter.

Owing to the above block arrangement, as shown at (b) in FIG. 6, the write data items A1, B1, C1, A2, B2,—of the respective frames received in succession are successively written into the DPRAM 502. Besides, as shown at (f) in FIG. 6, the readout data items A1, B1, C1, A2, B2,—of the respective frames are successively read out of the DPRAM 502 asynchronously to the write operations.

Since the write operations and readout operations for the DPRAM 502 are asynchronous to each other as stated above, a stuff control process to be explained below is performed.

First, the phase controller 505 generates an INC (increment) timing signal shown at (c) in FIG. 6. The INC timing signal rises to a high level in synchronism with the rise of the write timing pulse WTP shown at (a) in FIG. 6, and returns to a low level after a predetermined time period.

Also, the phase controller 505 generates a DEC (decrement) timing signal shown at (d) in FIG. 6. The DEC timing signal rises to a high level in advance of the write timing pulse WTP, and returns to a low level in synchronism with the rise of the write timing pulse WTP.

Herein, the phase controller 505 executes the stuff control process stated below, in a comparison timing term shown at (g) in FIG. 6.

Figure 7:
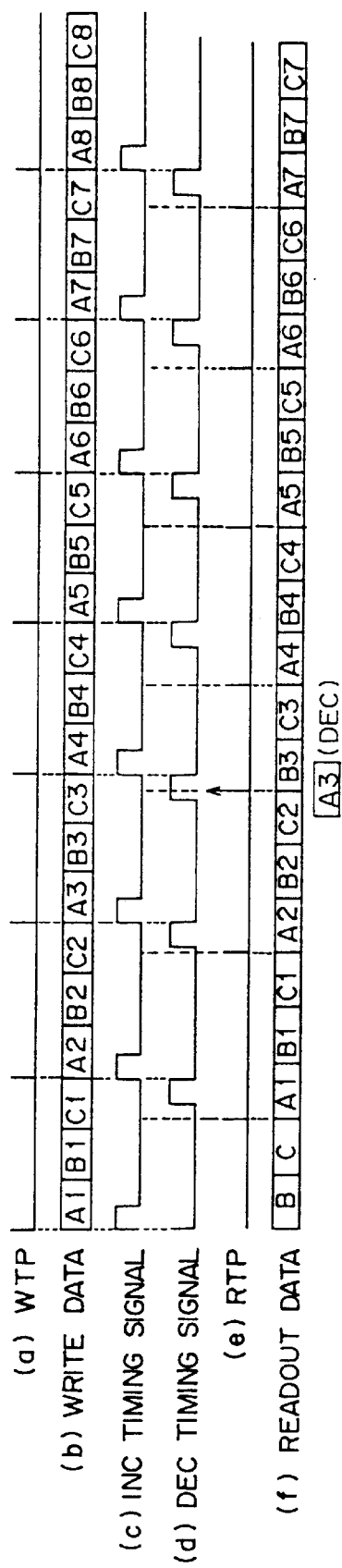
FIG. 7 is an operational timing chart (the second chart) of the asynchronous clock converter.

As seen from (d) and (e) in FIG. 7 ((a)–(f) in FIG. 7 correspond to (a)–(f) in FIG. 6, respectively), when a first comparator 506 included in the phase controller 505 detects the high level of the DEC timing signal at the timing at which the readout timing pulse RTP is output from the RPG 504, an output controller 508 also included in the phase controller 505 delivers the DEC signal to the RPG 504. Upon receiving the DEC signal, the RPG 504 forcibly sets the count value 1 in the ternary counter included therein.

As a result, the ternary counter in the RPG 504 is restrained from outputting the count value 0, so that the head frame (frame A3 at (f) in FIG. 7) among the readout data of the 3 frames to be read out of the DPRAM 502 next is discarded without being read out.

Thus, a discard process (DEC (decrement) process) with the frame as a unit is executed by the asynchronous clock converter (DS0) in such a case where the readout clock RCLK lags gradually over the write clock WCLK.

Figure 8:
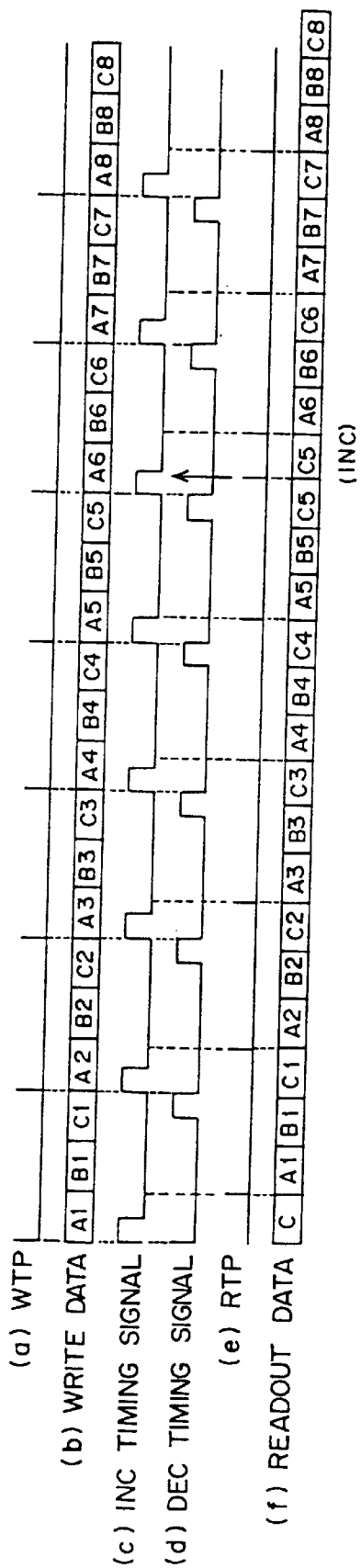
FIG. 8 is an operational timing chart (the third chart) of the asynchronous clock converter.

Besides, as seen from (d) and (e) in FIG. 8 ((a)–(f) in FIG. 8 correspond to (a)–(f) in FIG. 6, respectively), when a second comparator 507 included in the phase controller 505 detects the high level of the INC timing signal at the timing at which the readout timing pulse RTP is output from the RPG 504, the output controller 508 included in the phase controller 505 delivers the INC signal to the RPG 504. Upon receiving the INC signal, the RPG 504 forcibly sets the count value 2 in the ternary counter included therein.

As a result, the ternary counter in the RPG 504 outputs the count value 2 twice in succession, so that the tail frame (frame C5 at (f) in FIG. 8) among the readout data of the 3 frames read out of the DPRAM 502 last is repeatedly read out.

Thus, a repeat process (INC (increment) process) with the frame as a unit is executed by the asynchronous clock converter (DS0) in such a case where the readout clock RCLK leads gradually over the write clock WCLK.

In the above way, clock changeover processes in which the DS-0 data is transferred from the write clock WCLK to the readout clock RCLK are realized by the asynchronous clock converter (DS0).

Next, the functional construction of the asynchronous clock converter (signalling) 411s, 412s or 419s shown in FIG. 4 is basically the same as that of the asynchronous clock converter (DS-0) 411d, 412d or 419d explained above.

The asynchronous clock converter (signalling) 411s, 412s or 419s, however, is supplied with one group of parallel data items which consist of signalling bits of 4 bits and controlling bits of 4 bits, totalling 8 bits, per frame. Therefore, the deserialization circuit 501 shown in FIG. 5 is not necessary, and the DPROM 502 shown in FIG. 5 may have a storage capacity corresponding to 3 frames=3 addresses. Accordingly, only the count value of the built-in ternary counter may be supplied as the write address or readout address from the WPG 503 and RPG 504 to the DPRAM 502.

Description of the Cross-Connect Portions

Figure 9:
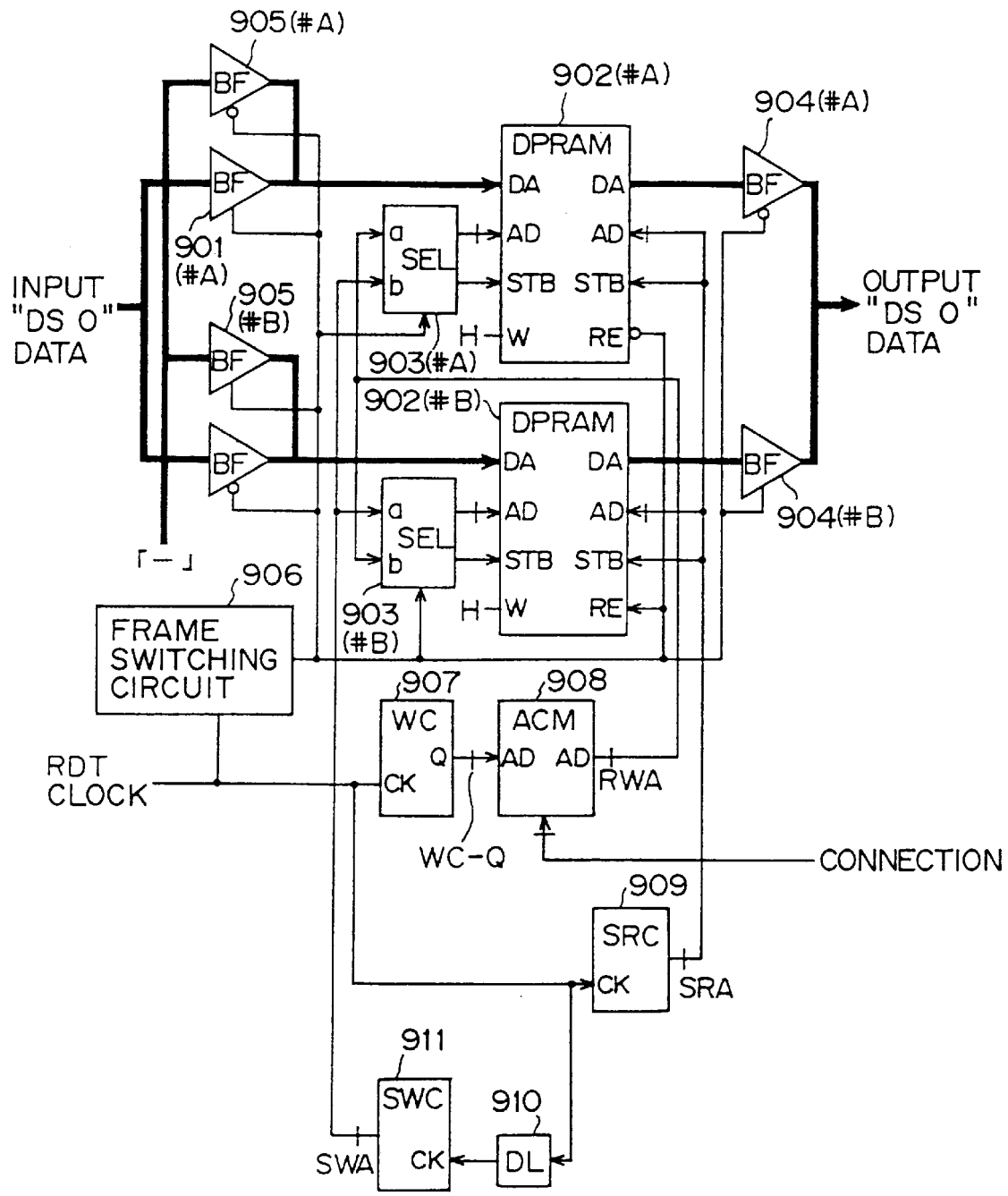
FIG. 9 is a block diagram showing a cross-connect portion.

FIG. 9 is a block diagram showing a DS-0 data processing part in the cross-connect portion 407 (reception side) or cross-connect portion 407 (transmission side) depicted in FIG. 4.

As stated before, the cross-connect portion 407 executes the cross-connect process in which the data (input DS-0 data) of each channel of each DS-1 circuit on the input side is allocated as the data (output DS-0 data) of the specified channel of the specified DS-1 circuit on the output side.

Referring to FIG. 9, each of two dual-port random access memories (DPRAM) 902 (#A and #B) can store therein DS-0 data corresponding to:

1 frame×n DS-1 circuits=24×n bytes

In the frame term during which the input DS-0 data items for 1 frame are being written into the DPRAM 902 (#A), the output DS-0 data items for 1 frame are read out of the DPRAM 902 (#B). Besides, when invalid data "-" is written into an address having completed the readout, the content of the particular address is cleared. To the contrary, in the frame term during which the input DS-0 data items for 1 frame are being written into the DPRAM 902 (#B), the output DS-0 data items for 1 frame are read out of the DPRAM 902 (#A). Besides, when invalid data "-" is written into an address having completed the readout, the content of the particular address is cleared.

The clear operation is significant in such a case where the output channel hitherto used has fallen into disuse by reason of the alteration of settings. Herein, the clear operation is executed in order that unnecessary data written before the alteration of the settings may be prevented from being delivered from the address of the DPRAM 902 corresponding to the particular output channel in this case.

In each DPRAM 902, as listed in FIG. 10, addresses 0 thru (n-1) correspond respectively to the DS-0 data #1-1, #2-1, #3-1, - and #n-1 of respective first channels (respective first time slots) of the DS-1 circuits #1 thru #n on the output side. Addresses n thru (2n-1) correspond respectively to the DS-0 data #1-2, #2-2, #3-2, - and #n-2 of the second channels (second time slots) of the DS-1 circuits #1 thru #n on the output side. Thenceforth, similar corresponding relations are held until the last addresses 23n thru (24n-1) correspond respectively to the DS-0 data #1-24, #2-24, #3-24, - and #n-24 of the twenty-fourth channels (twenty-fourth time slots) of the DS-1 circuits #1 thru #n on the output side.

Now, let's consider the time period during which the output count value WC-Q of a write counter (WC) 907 in FIG. 9 counts up from 0 to (24n-1) in synchronism with the RDT clock (refer to FIG. 4). Meantime, the DS-0 data #1-1, #2-1, #3-1, - and #n-1 of respective first channels of the DS-1 circuits #1 thru #n; the DS-0 data #1-2, #2-2, #3-2, - and #n-2 of respective second channels of the DS-1 circuits #1 thru #n; -; and the DS-0 data #1-24, #2-24, #3-24, - and #n-24 of respective twenty-fourth channels of the DS-1 circuits #1 thru #n are successively input as the input DS-0 data in the same relations as the arrangement relations indicated in FIG. 10.

Besides, an access control memory (ACM) 908 in FIG. 9 stores therein a table as shown in FIG. 11, which is set as connection renewal data indicated in FIG. 9, by the controller 408 shown in FIG. 4. In the table, write addresses RWA (random write addresses) to be designated for the DPRAM 902 which is executing the write operation are listed in correspondence with the respective output count values WC-Q of the write counter (WC) 907.

In this way, the input DS-0 data items of the respective channels for one frame, of each DS-1 circuit on the input side are written into those storage locations of addresses in the DPRAM 902 which correspond to the respective channels of each DS-1 circuit on the output side.

The contents (FIG. 10) of the DPRAM 902 are read out successively from the address 0 in accordance with serial read addresses SRA in the next frame term, the addresses SRA being output by a serial read counter (SRC) 909 which counts up in synchronism with the RDT clock. This realizes the cross-connect processes in which the data items of the respective channels of each DS-1 circuit on the input side are allocated as the data items of the designated channels of the designated DS-1 circuits on the output side.

The construction and operation of the cross-connect portion in FIG. 9 will be described in more detail, reference being had also to FIG. 12.

Figure 12:
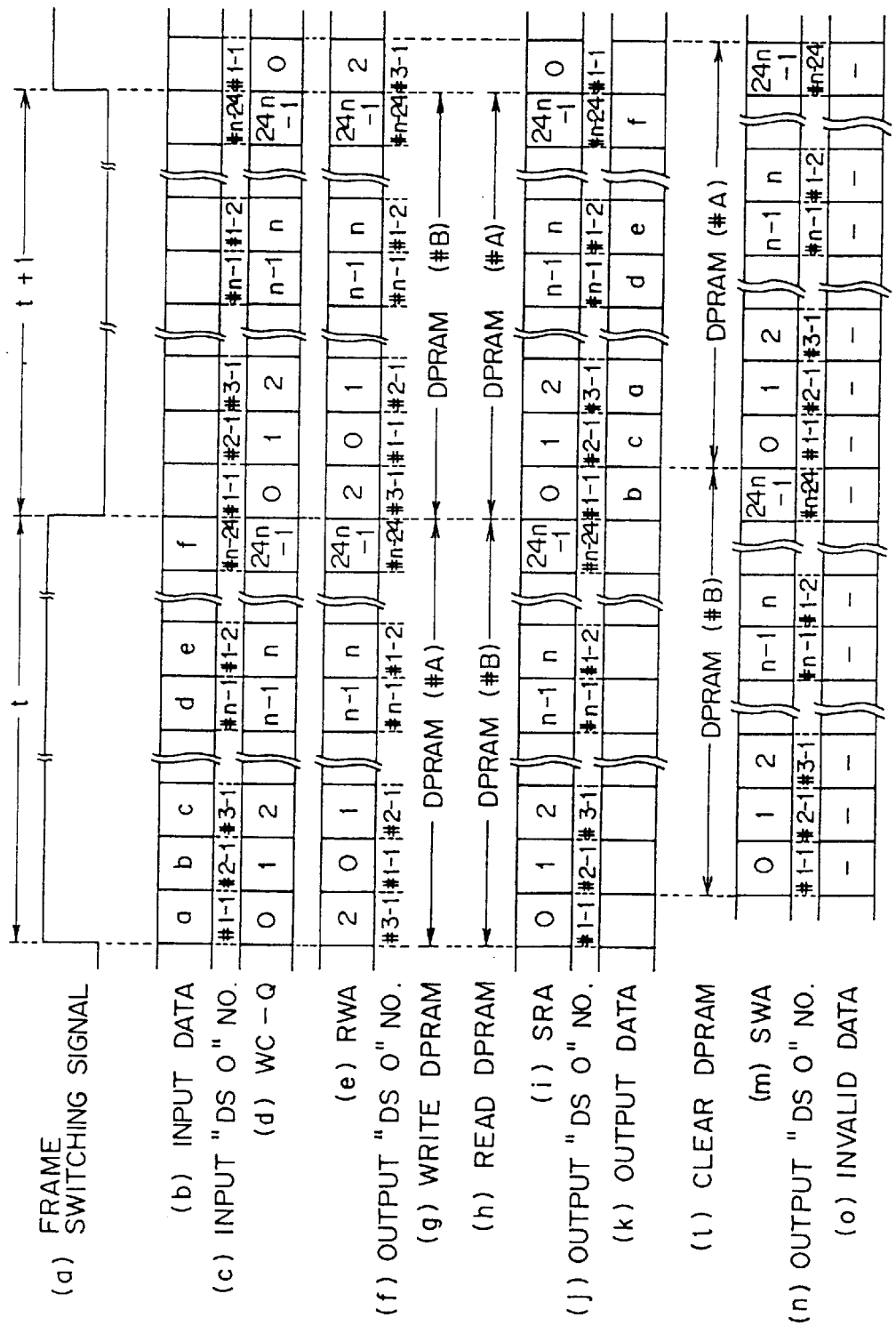
FIG. 12 is an operational timing chart of the cross-connect portion.

A frame switching circuit 906 delivers a frame switching signal the low level and high level of which are changed-over every counting of the RDT clock for 24 channels, in other words, every frame term in synchronism with the RDT clock as shown at (a) in FIG. 12.

While the frame switching signal is at the high level, a buffer (BF) 901 (#A) is ON. In addition, a selector (SEL) 903 (#A) selects the random write address RWA received from the ACM 908 through its terminal a, and it supplies the received address to the address input terminal AD and strobe terminal STB of the DPRAM 902 (#A) on the write side thereof.

As a result, while in a frame term t shown at (a) in FIG. 12, the output count value WC-Q of the write counter (WC) 907 counts up from 0 to (24n-1) in synchronism with the RDT clock as shown at (d) in FIG. 12, the items of input DS-0 data (refer to (c) in FIG. 12 regarding input DS-0 Nos. (#DS-1 circuit Nos. channel Nos.)) a, b, c, - d, e, - and f which are successively input as shown at (b) in FIG. 12 are written ((g) in FIG. 12) into those storage locations of the DPRAM 902 (#A) (refer to (f) in FIG. 12 regarding output DS-0 Nos. (#DS-1 circuit Nos.-channel Nos.)) which correspond to the random write addresses RWA successively supplied from the access control memory (ACM) 908 as shown at (e) in FIG. 12.

While the frame switching signal is at the high level, a buffer (BF) 905 (#A) is OFF, so that invalid data "-" is not written into the DPRAM 902 (#A).

Besides, while the frame switching signal is at the high level, the input status of the read enable terminal RE of the DPRAM 902 (#A) is a low level, and a buffer (BF) 904 (#A) is OFF, so that no data is read out of the DPRAM 902 (#A).

Incidentally, the input status of the write enable terminal W of each DPRAM 902 is always a high level.

In addition, while the frame switching signal is at the high level, the input status of the read enable terminal RE of the DPRAM 902 (#B) is a high level, and a buffer (BF) 904 (#B) is ON. In addition, the serial read addresses SRA delivered from the serial read counter (SRC) 909 are supplied to the address input terminal AD and strobe terminal STB of the DPRAM 902 (#B) on the readout side thereof.

As a result, while in the frame term t shown at (a) in FIG. 12, the serial read addresses SRA which are delivered from the SRC 909 in synchronism with the RDT clock change from 0 to (24n-1) as shown at (i) in FIG. 12, the items of data at those storage locations of the DPRAM 902 (#B) (refer to (j) in FIG. 12 regarding output DS-0 Nos. (#DS-1 circuit Nos.-channel Nos.)) which correspond to the addresses SRA are successively read out ((h) in FIG. 12) as the items of output DS-0 data as shown at (k) in FIG. 12.

Besides, while the frame switching signal is at the high level, a buffer 901 (#B) is OFF, and a buffer 905 (#B) is ON, so that invalid data "-" is input to the DPRAM 902 (#B). Further, in this case, a selector (SEL) 903 (#B) selects a serial write address SWA received from a serial write counter (SWC) 911 through its terminal a, and it supplies the received address to the address input terminal AD and strobe terminal STB of the DPRAM 902 (#B) on the write side thereof.

The SWC 911 counts up in accordance with a clock which is obtained in such a way that the RDT clock is delayed one clock cycle by a delay circuit (DL) 910. As shown at (m) in FIG. 12, accordingly, the count values of the serial write addresses SWA lag one clock cycle relative to the count values of the serial read addresses SRA shown at (i) in FIG. 12.

For this reason, in the frame term t during which the frame switching signal is at the high level, the items of invalid data "-" are successively written as shown at (o) in FIG. 12 into those storage locations of the DPRAM 902 (#B) from which the data items have been read out one clock cycle before (refer to (n) in FIG. 12 regarding output DS-0 Nos. (#DS-1 circuit Nos.-channel Nos.)). Thus, the contents of the DPRAM 902 (#B) having completed the readout can be cleared ((1) in FIG. 12).

Subsequently, in the frame term (t+1) shown at (a) in FIG. 12 during which the frame switching signal is at the low level, the operational relations between the constituents #A and #B explained above become quite reverse to the foregoing. As a result, the items of output DS-0 data for one frame written into the respective storage locations of the DPRAM 902 (#A) during the last frame term t are read out therefrom, and the items of invalid data "-" are written into the addresses of the DPRAM 902 (#A) having completed the readout, whereby the contents of the addresses are cleared.

Besides, the items of new input DS-0 data for one frame are written into the DPRAM 902 (#B).

The cross-connect processes are realized in the above way.

What is claimed is:

1. A subscriber-line transmission apparatus which is installed between a network-side apparatus and a subscriber-side apparatus, comprising:

a circuit termination unit terminating a plurality of circuits which are synchronized to a plurality of timing sources;

a cross-connect unit executing cross-connect processes among the plurality of circuits which are terminated by said circuit termination unit; and an asynchronous-clock conversion unit converting a clock for synchronizing communication data, such that the communication data which is transferred to guarantee a loop timing between said circuit termination unit and said cross-connect unit are operated on the basis of clocks asynchronous to each other.

2. The subscriber-line transmission apparatus as defined in claim 1, wherein:

said circuit termination unit terminates circuits which are operated in synchronism with said network-side apparatus when an independent timing source is connected, and terminates circuits which are connected to and operated at timings dependent upon said subscriber-side apparatus; and said asynchronous-clock conversion unit converts clocks to synchronize items of communication data, such that the respective communication data items which are bidirectionally transferred between said cross-connect unit and the circuit termination unit terminates the circuits to which said network-side apparatus is connected, and converts a clock to synchronize communication data, such that the communication data which is transferred toward said cross-connect unit from said circuit termination unit terminates the circuits to which said subscriber side apparatus is connected.

3. The subscriber-line transmission apparatus as defined in claim 2, wherein said network-side apparatus includes one of an integrated digital terminal and a digital network element.

4. The subscriber-line transmission apparatus as defined in claim 3, wherein said digital network element includes one of a digital cross-connect system and a channel bank equipment.

5. The subscriber-line transmission apparatus as defined in claim 2, wherein said subscriber-side apparatus includes customer premises equipment.

6. The subscriber-line transmission apparatus as defined in claim 1, wherein:

the communication data contains user data and control data; and said asynchronous-clock conversion unit converts clocks to synchronize the user data and the control data, independently of each other.

7. The subscriber-line transmission apparatus as defined in claim 1, wherein said asynchronous-clock conversion unit includes:

a storage unit storing communication data items for a plurality of frames, each of which is a group of data including predetermined channel data items;

a write control unit writing the communication data items into said storage unit successively in units of the frames in synchronism with a clock on an input side of said subscriber-line transmission apparatus;

a readout control unit reading the communication data items out of said storage unit successively in units of said frames in synchronism with a clock on an output side of said subscriber-line transmission apparatus; and a phase control unit executing a stuff control which compares phasic relations of the input-side clock and the output-side clock, thereby instructing said write control unit and said readout control unit to discard and repeatedly deliver said communication data items in units of said frames, respectively, as needed.

8. The subscriber-line transmission apparatus as defined in claim 1, further comprising a selection unit transferring the communication data between the circuit termination unit transparently without executing the cross-connect process and the asynchronous-clock conversion process.

9. The subscriber-line transmission apparatus as defined in claim 8, wherein said communication data which is transferred between said circuit termination unit and said asynchronous-clock conversion process is un-channelized DS-1 data.

10. The subscriber-line transmission apparatus as defined in claim 8, wherein said communication data which is transferred between said circuit termination unit with executing said cross-connect and said asynchronous-clock conversion process is channelized DS-1 data.

11. A method for subscriber-line transmissions between a network-side apparatus and a subscriber-side apparatus, comprising:

terminating a plurality of circuits which are synchronized to a plurality of timing sources;

executing cross-connect processes among the plurality of circuits which are terminated; and converting a clock for synchronizing communication data to guarantee a loop timing, such that the communication data which is transferred between a circuit termination unit and a cross-connect unit are operated on the basis of clock's asynchronous to each other.

12. A subscriber-line transmission apparatus for synchronizing asynchronous clocks, comprising:

a circuit terminating set to terminate a plurality of circuits synchronized with timing sources;

a cross-connecting set to execute processes from one of said plurality of circuits to another of said plurality of circuits; and a clock converting set to convert clocks which synchronize communication data to guarantee a loop timing, the communication data being transmitted between said circuit terminating set and said cross-connecting set.

13. A method of subscriber-line transmissions for synchronizing asynchronous clocks, comprising:

synchronizing a plurality of terminating circuits with timing sources, the plurality of terminating circuits embodying a circuit termination set;

executing processes from one of said plurality of terminating circuits to another of said plurality of terminating circuits, by way of a cross-connecting set; and guaranteeing loop timing by converting clocks, which synchronize communication data, with the communication data being transmitted between the circuit terminating set and the cross-connecting set.

* * * * *